(12) United States Patent
Graham

(10) Patent No.: US 6,896,188 B1
(45) Date of Patent: May 24, 2005

(54) METHOD AND SYSTEM FOR PROVIDING A CHECK PREMIUM

(76) Inventor: Stuart Graham, 12444 Whispering Tree La., Poway, CA (US) 92604

( * ) Notice: Subject to any disclaimer, the term of this patent is extended or adjusted under 35 U.S.C. 154(b) by 0 days.

(21) Appl. No.: 10/794,359

(22) Filed: Mar. 5, 2004

(51) Int. Cl.$^7$ .............................................. G06K 19/00
(52) U.S. Cl. ............................ 235/487; 283/58; 283/31
(58) Field of Search ................................ 235/487, 375, 235/378–379, 485; 705/33, 45, 53, 62, 40, 75

(56) References Cited

U.S. PATENT DOCUMENTS

| | | | | |
|---|---|---|---|---|
| 3,790,193 A | * | 2/1974 | McBride ...................... | 283/57 |
| 5,184,910 A | * | 2/1993 | Betsill .......................... | 402/8 |
| 5,491,325 A | * | 2/1996 | Huang et al. ................. | 705/45 |
| 5,781,654 A | * | 7/1998 | Carney ........................ | 382/137 |
| 6,170,744 B1 | * | 1/2001 | Lee et al. .................... | 235/380 |
| 6,611,598 B1 | * | 8/2003 | Hayosh ........................ | 380/54 |
| 2002/0065771 A1 | * | 5/2002 | Dutta ........................... | 705/40 |
| 2003/0115155 A1 | * | 6/2003 | Doran .......................... | 705/75 |

* cited by examiner

Primary Examiner—Thien M. Le
Assistant Examiner—Edwyn Labaze
(74) Attorney, Agent, or Firm—Wood, Herron & Evans, L.L.P.

(57) ABSTRACT

An issuer distributes to its customers a premium to attract and retain consumers. The premium comprises a checkbook having a number of partially pre-printed checks from a number of merchants. The checks are redeemable at the merchants for a predetermined amount of money towards a purchase. The consumer fills out certain information when presenting the check so that the transaction appears to be performed using a check as the method of payment while the consumer is still able to receive the financial benefit often accompanying the use of coupons. The remaining transaction amount is made using conventional payment methods.

36 Claims, 2 Drawing Sheets

METHOD AND SYSTEM FOR PROVIDING A CHECK PREMIUM

FIELD OF THE INVENTION

The present invention relates generally to a marketing plan and more particularly to a customer acquisition and retention plan.

BACKGROUND OF THE INVENTION

One of the most common concerns for many businesses is the need to develop fresh ways to acquire new customers and to retain current customers. There are currently a number of rewards programs in place across many different merchants that attempt to build customer loyalty and attract new consumers. These types of programs tend to reward consumers for shopping frequently at the sponsoring merchant and are usually tied to the amount, not just the number, of purchases as well.

Another approach to attracting customers is the use of coupons. As is well known, coupons are distributed through many different channels and, when presented at the time of purchase, provide an instant discount off an item or items. Coupons can be related to a particular product or a particular merchant. Thus, coupons may be sponsored by a manufacturer or by a merchant. Coupons have a number of drawbacks from the perspective of the merchant. One drawback is that in the view of some consumers, the use of coupons carries some stigma for both the consumer and the merchant. Accordingly, consumers who are embarrassed to use coupons are not attracted to a merchant by coupons regardless of their savings. Additionally, tracking coupons to determine which distribution channels were effective and to identify useful consumer trends or information has proven difficult. Other drawbacks to coupons include that consumers often forget them when shopping and that coupons typically do not require a large purchase at the merchant; but, instead, can be used if the consumer is spending $100 or only $10. Also, consideration must be given to the costs of printing and distributing coupons. The coupon approach, therefore, for attracting and retaining customers clearly has a number of problems.

Thus, an unmet need exists for a customer acquisition and retention program that overcomes the problems of traditional coupons and rewards programs.

SUMMARY OF THE INVENTION

Accordingly, embodiments of the present invention relate to a customer acquisition and retention program that provides consumers with a check-like payment option that effectively reduces the cost of items being purchased. This payment option is easy to use in that it relies on the consumer's familiarity with checks and it avoids the embarrassment and other drawbacks of coupons.

According to this embodiment, an issuer distributes to its customers a premium to attract and retain consumers. The premium comprises a checkbook having a number of partially pre-printed checks from a number of merchants. The checks are redeemable at the merchants for a predetermined amount of money towards a purchase. The consumer fills out certain information when presenting the check so that the transaction appears to be performed using a check as the method of payment while the consumer is still able to receive the redemption benefit often accompanying the use of coupons. The remaining transaction amount is made using conventional payment methods.

One aspect of the present invention relates to a premium for attracting customers. According to this aspect, the premium includes a plurality of checks, each check related to a respective merchant and including a predetermined redemption amount. The premium also includes a checkbook comprising the plurality of checks wherein each check includes an identification of an issuer of the checkbook.

Another aspect of the present invention relates to a method of creating a premium to attract customers. In accordance with this aspect, a publisher of the premium agrees with a plurality of merchants to print a respective check, for each merchant, in a plurality of checkbooks, each respective check in a particular checkbook related to a respective merchant and including a predetermined dollar amount. The publisher also agrees with a plurality of issuers to provide to each issuer a respective subset of the plurality of the checkbooks, wherein each check in the respective subset of checkbooks includes an identification of a respective issue of the checkbook. Once the participants agree with the program, the publisher distributes the plurality of checkbooks to the plurality of issuers.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

Figure 1:
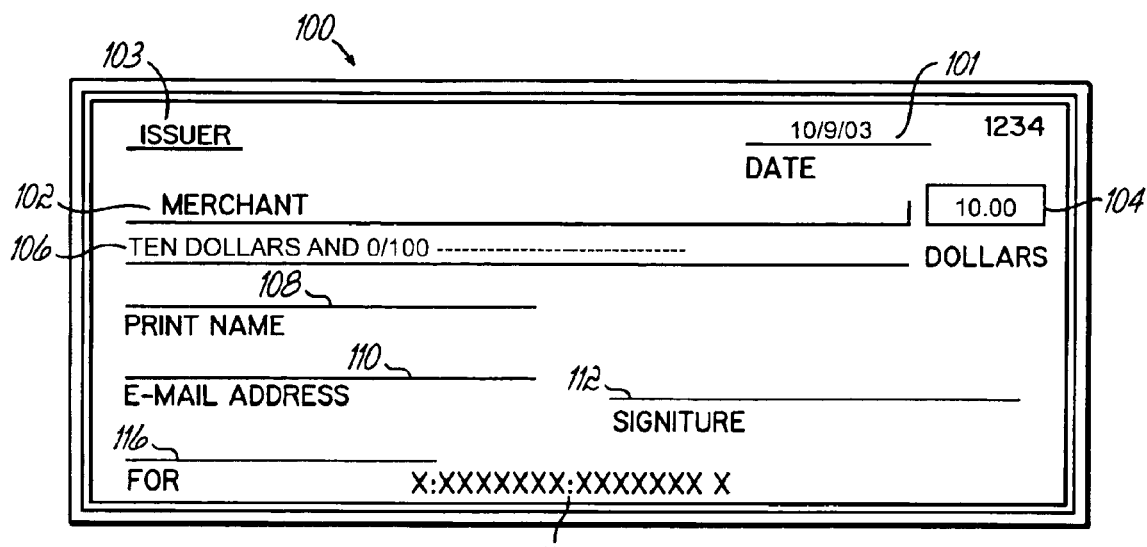
FIG. 1 illustrates an exemplary blank check according to an embodiment of the present invention.

Turning to FIG. 1, this figure illustrates an exemplary blank check 100 according to an embodiment of the present invention. While only a single check is depicted in FIG. 1, embodiments of the present invention contemplate a book of such checks being distributed to a consumer. For example, a book of thirty different checks may be-distributed to a consumer; however, one of ordinary skill will appreciate that the book of checks may include any number of checks. Many consumers currently carry a checkbook and are familiar with using checks to pay for merchandise at a restaurant or other retail establishment. Thus, many consumers are more likely to feel comfortable using the check 100 than a coupon. The check 100 is advantageously bundled in a checkbook that resembles a regular checkbook with each check printed on high-quality paper to closely resemble a regular check.

The check 100 includes a number of fields that are familiar to most consumers. The fields illustrated in FIG. 1 are exemplary in nature and are not intended to limit embodiments of the present invention to inclusion of only these fields on a check. The date field 101 may be left blank or may be filled in with a pre-printed date. Also, the date field may represent an expiration date for the check 100 that requires the consumer to use the check 100 before that date 101. The payee field 102 will include the name of the merchant where the check may be redeemed. For branding purposes, this payee field 102 may include a logo or other recognizable image in addition to, or in place of, the merchant's name. In addition to the payee field 102 being a merchant, the payee field 102 may refer to a manufacturer. For example, the check 100 may be redeemed for $20 towards the purchase of at least $100 of Nike® shoes and apparel. In this instance, the payee filed 102 would identify Nike® and allow the consumer to redeem the check 100 at a variety of different merchants. Exemplary merchants may include restaurants, home-improvement centers, and other retail stores. In the past, not all merchants were involved in distributing and accepting coupons. Some higher-end merchants believe that coupons tend to detract from their image and may reflect negatively on their merchandise and their customers. The check 100, however, does not have these drawbacks as the check 100 is able to offer a benefit to the consumer without resembling a coupon in its appearance or use.

The issuer field 103 identifies who has distributed the checkbook containing the check 100. The issuer will most frequently be different than the merchant. In exemplary embodiments, the issuer is another type of merchant that wants to attract and retain customers of their own. For example, the issuer may be a newspaper, an insurance agent, a mortgage company, a fund-raising organization, an apartment rental office, a home builder, a real-estate professional, a car dealership, a public broadcasting station, a wireless phone company, etc. In some embodiments, the issuer may also be a merchant having a check in the checkbook as any merchant is interested in attracting and retaining customers.

From the perspective of the issuer, the checkbook (and check 100) is seen as a premium that can be used to attract and reward customers. The checkbook has an actual high value in that it may include 30 or more checks from area merchants. The checkbook also has a perceived high value in that it has a quality presentation that resembles a checkbook instead of resembling a stack of coupons. The checks are simple to use, relate to high profile merchants, and provide savings on everyday shopping. Thus, the issuer will be able to easily promote the checkbook as a premium to attract and retain customers. Additionally, the merchants are assured that a certain type of demographic will receive their checks unlike coupons that are printed in the paper or on other widely-distributed advertisements.

The amount field 104 is preprinted with the amount of redemption provided by the check 100 as is the field 106. The field 104 uses numerals and the field 106 uses words to represent the amount of the check 100. Thus, to use the check 100, the consumer will present the check 100 at the time of payment for their goods or services and will receive a credit for the amount in the field 104. Then the consumer will only have to pay the remaining balance, thereby, receiving a benefit for the amount 104. While the end result is similar to that of a coupon, the check offers an easier and more comfortable way for the consumer to receive a benefit.

Fields 108 and 110 are useful to collect personal information about the consumer. The exemplary fields depicted ask for the consumer's name and e-mail address. Other information could be collected such as the consumer's phone number, the consumer's age, the consumers sex, or other information. The signature block 112 is another way that the check 100 is made to resemble a regular check rather than a coupon. While the signature block 112 could be omitted, its presence continues the feeling within the consumer that a check, and not a coupon, is being used to pay for services or goods. One of ordinary skill will readily recognize that the fields 108 and 110 do not necessarily have to be arranged as specifically shown in FIGS. 1 and 2. Instead, these fields may be arranged in a number of different ways without departing from the scope of the present invention. For example, the fields 108 and 110 may be positioned on the right-hand side of the check between the "amount" line and the "signature" line. Alternatively, field 108 may be located on the left-side while field 110 may be located on the right-side. The present invention is not intended to be limited to the specific check layout depicted in the figures.

The "For" block 116 may be left blank or be filled in with additional information by the merchant. One exemplary embodiment of the present invention includes preprinted information in the "for" block 116 that specifies the conditions for using the check 100. For example, this pre-printed information may sate that the check 100 can only be used for a purchase of more than $40 or some other predetermined amount. In this way, the merchant may ensure that each use of the check 100 is accompanied by a purchase over a certain threshold amount. This benefits the merchant because they are able to guarantee that the consumer will spend a certain amount when redeeming the check 100. Although the reverse-side of the check 100 is not explicitly shown, the reverse-side may include information about the check 100, the merchant, or the issuer. For example, the reverse-side may include additional rules and requirements about redeeming the check. Alternatively, the reverse-side may include additional advertisements or marketing material.

The bar-code or other code 114 may resemble that of a regular check. For example, such bar-codes may be printed with magnetic ink so that a computer or other scanner may scan the check to automatically extract the coded information 114. The code 114 may also be printed with regular ink as well and be optically scanned as well. Exemplary uses of the code 114 will be described in more detail later. However, for a brief overview, the code 114 may me used to identify which checkbook the check 100 is in, which merchant sponsored the check, which issuer distributed the check, or some combination of such information. The code 114 may also be a security measure that authenticates the check 100.

At least one embodiment of the present invention contemplates a check 100 that does not explicitly include the field 103 that identifies the issuer. For example, an issuer may require so few checkbooks that it is not cost-effective to personalize each check and/or the checkbook with a logo or other identifier of the issuer. Thus, a "generic" check and checkbook is contemplated that does not explicitly identify the issuer. However, in this instance, the code 114 may still be used to identify the issuer. For example, the code 114 may be a numeric, or alpha numeric, sequence that is different for each check in a checkbook. By maintaining records of which sequence of codes are associated with which checkbook, the issuer of a particular checkbook may be identified even if the checkbook does not explicitly do so.

Figure 2:
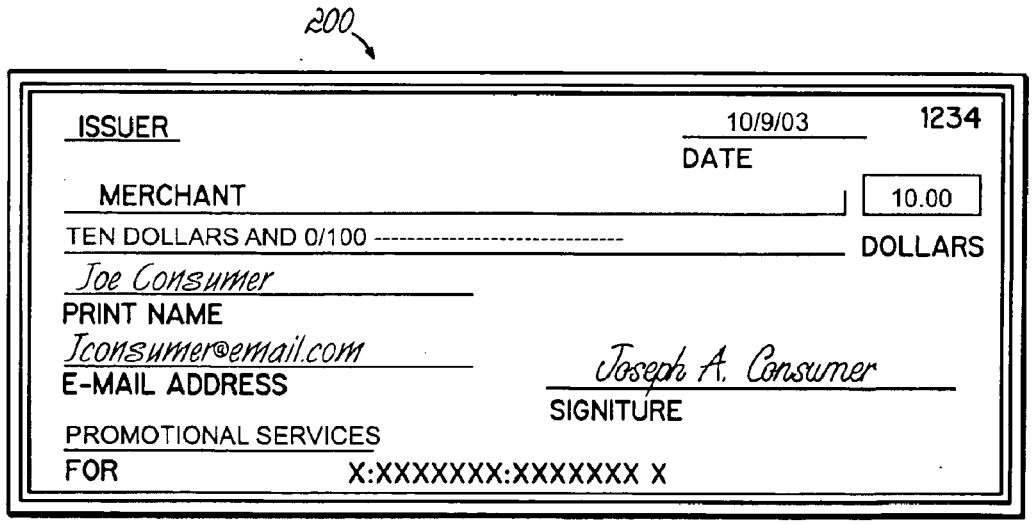
FIG. 2 illustrates the check of FIG. 1 after it has been filled-in by a consumer.

FIG. 2 illustrates the check 100 after it has been filled-in by the consumer when purchasing some item or service. Of course, the check may be filled-in at the time of purchase or a consumer may fill in the information earlier to speed-up the transaction process.

A number of different parties are involved in generating and distributing the check 100 and its accompanying checkbook. To be a successful marketing method, the checks should offer a benefit to all the parties involved in the process. The benefit to the consumer is evident. The consumer is able to save money on everyday shopping at quality retailers and merchants. Furthermore, the consumer can avoid the hassle and embarrassment that often accompany the use of traditional coupons.

The merchants benefit in a number of ways. By partnering with only certain types of issuers, the merchant has some control of the demographic to which its checks are distributed thereby avoiding distribution costs to demographic segments that are not interested in that merchant. The merchant may also place conditions on redeeming the check that ensure a certain amount of money will be spent when the check is redeemed. Additionally, a merchant that otherwise may not use coupons is able to offer a similar benefit that does not detract from its image or the image of its merchandise.

The issuers benefit by offering a premium that attracts consumers. The checkbook premium is attractive to consumers both economically and aesthetically. Also, the checkbook premium is unique in the marketplace and helps distinguish the issuer over its competitors. Thus, the checkbook premium offers a way for the issuer to easily and effectively attract and retain customers.

One party not discussed yet is the checkbook publisher. The publisher creates the relationship between the merchants and the issuers that allow the checkbook to be attractive to consumers and, thus, attractive to the issuers and merchants. The publisher offers the merchant a way to distribute the checks without the merchant incurring printing and distribution costs. The publisher offers the issuer a premium that costs far less than its value to consumers and is distinguishable in the marketplace.

Figure 3:
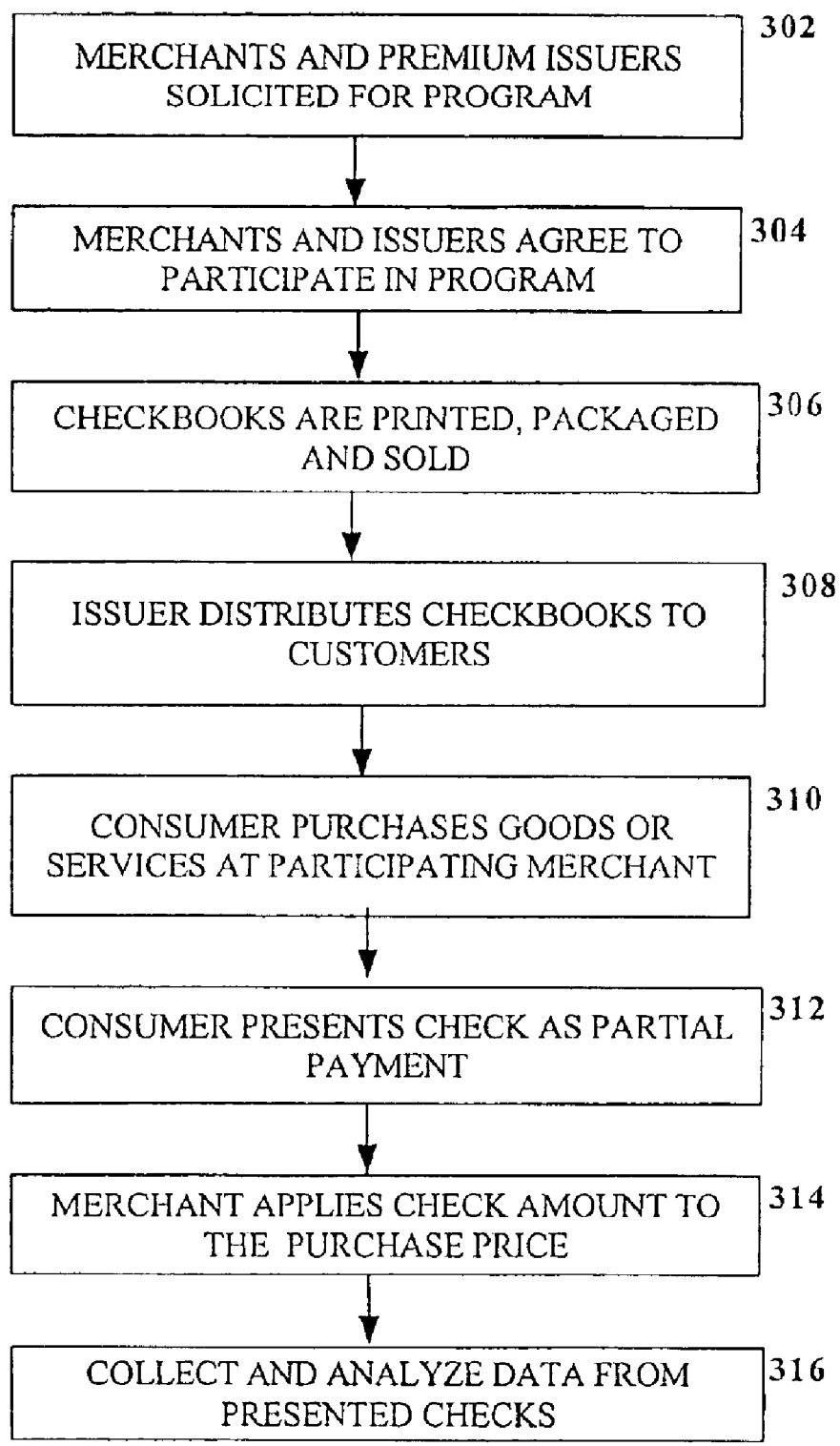
FIG. 3 illustrates a method of retaining and attracting customers in accordance with an embodiment of the present invention.

With respect to FIG. 3, the interaction between these parties is discussed in detail to explain the generation and distribution of the checkbooks earlier described. In step 302, the publisher of the checkbooks solicits merchants and issuers to participate in the marketing program. In an exemplary embodiment, the solicitation occurs in a particular geographic region or urban location. While a nationwide program may have its advantages and is contemplated within the scope of the present invention, the description that follows pertains to a program that involves a local geographic location.

The publisher contacts quality retailers that may be reluctant to participate in a coupon program or who provide everyday services and products to the average consumer. The checkbook publisher also contacts potential issuers and explains the benefits of the checkbook premium. The issuers contacted are those issuers that will likely attract a demographic that is attractive to the merchants. If necessary, the publisher can provide market surveys and other data that supports the conclusion that the checkbook premium is an attractive premium for many consumers.

In step 304, a number of merchants and issuers will agree to participate in the program. To participate, a merchant will determine the parameters for its check in the checkbook. For example, the merchant will determine what personal information to collect from the consumer, what amount to make the check; and what conditions apply to redeeming the check. The issuer will determine how it plans to distribute the checkbooks and will negotiate how much it will pay for each checkbook. Each checkbook may have only one check for each participating merchant or a merchant may be allowed to have multiple checks to try-out different discounting strategies. The issuer will typically benefit from having as many different merchants in the checkbook as possible but may benefit from a merchant having multiple checks if that merchant is very popular.

Once the participants of the program have been determined, the publisher prints and packages the checkbooks in step 306. The checkbooks may be packaged per each issuer's own specification or a single version of the checkbooks may be printed for distribution to all issuers. Once printed and packaged the checkbooks are bought for the agreed upon price by each issuer and delivered to the issuer. For example, a car dealership may know that it will likely sell 3,000 cars in the upcoming months and so it will contract with the publisher to buy 3,000 checkbooks at $20,000 per 1,000 checkbooks. Some other issuer may need a different amount of checkbooks and, thus, may pay a different price for their checkbooks.

Once each issuer has its checkbooks from the publisher, then the issuer distributes, in step 308, the checkbook as a premium to its customers. The issuer will likely advertise this premium so that consumers are aware of this potential benefit provided by the issuer. For example, when a subscriber starts or renews a subscription to the newspaper, the newspaper can send the subscriber a checkbook. Once the consumer (i.e., the subscriber) has the checkbook, then the consumer can start using the checks contained therein. Thus, In step 310, the consumer will purchase goods and services at one of the participating merchants and present a check, in step 312, for partial payment of the goods and services. Because of the format of the check and the checkbook, this transaction resembles the presentation of a regular check for payment and avoids the appearance of using a coupon. When presented with the check, the merchant reduces, in step 314, the purchase by the appropriate amount and then receives the remaining payment amount from the consumer.

In step 308, as just described, the issuer is responsible for distributing the checkbooks to the customers. However, embodiments of the present invention contemplate alternative distribution methods as well. For example, the publisher may also offer a turnkey fulfillment solution to the issuer where the checkbook will be mailed to the issuer's customer. In this instance, the issuer collects the necessary personal information about a customer so that the publisher can directly mail the checkbook to the customer. Some issuers may want to distribute the checkbooks themselves while some may want the publisher to do so. The publisher will be able to accommodate either alternative and may adjust the pricing arrangement accordingly. One advantage of the publisher generating the checkbook after the personal information from a customer has been collected is that this information may be encoded on the checks sent to that customer. For example, the code 114 may have encoded therein the name of the customer, some other identifier of the customer, or even demographic information about that customer. Thus, detailed marketing data can be collected and analyzed based on the code 114 once a check has been presented to a merchant.

Step 316 is an optional step but one that may benefit the merchant, the issuer, and the publisher. In step 316 data is collected about the checks that are presented at the various merchants. In one exemplary embodiment, a merchant may perform its own data collection and analysis. The e-mail addresses and other information on the front of each check offer opportunities to target advertisements to particular segments of its customer base. Additionally, the code 114 on the check offers additional information useful to a merchant.

For example, the merchants and publisher can jointly determine a number of characteristics of how the checks were used by consumers. By collecting information from a number of merchants, the coded information may be used to determine which issuers appeared to drive more customers to which merchants. The coded information may also be used to determine which checkbook (i.e., which consumer) was used at multiple merchants and thus identify opportunities for cross marketing or targeted marketing.

Although the present invention has been described and illustrated in detail, it is clearly understood that the same is by way of illustration and example only and is not to be taken by way of limitation, the spirit and scope of the present invention being limited by the terms of the appended claims and their equivalents. For example, other embodiments of the present invention contemplate different versions of the checkbook to cater to different demographics or different groups. The different checkbooks may simply have a different physical appearance that is meant to attract a desired demographic or the actual contents (i.e., the checks) of the different versions may reflect merchants that are attractive to certain demographics. For example, there could be a sports checkbook, a woman's checkbook, a children's checkbook etc. Also, a different checkbook appearance may be offered to each issuer to allow customized branding or other logos to appear on the checkbook. One exemplary embodiment of the present invention contemplates offering exclusivity to merchants in the checkbook. For example. In a particular geographic location only one chain of home-improvement stores will be allowed to have a check in the checkbook. Thus, in this embodiment, the merchant receives another benefit in that consumers receiving the checkbook are driven to that merchant and away from their competitors.

With the growth of the Internet, a number of merchants now have a significant online presence and alternative embodiments of the present invention contemplate checks that may be redeemed via an online transaction. Thus, a check may be redeemed at a "bricks and mortar" merchant or at an online merchant. For merchants having both a physical and an online presence, the check may be redeemed at either location. For example, the alphanumeric information on the check or checkbook may include a redemption code that a consumer would use to redeem a check online. Alternatively, a separate and specifically online code may be printed on the check thereby allowing the consumer to redeem the check online.

What is claimed is:

1. A product for attracting customers, comprising:
  a plurality of checks, each check specifying a respective merchant and including a predetermined dollar amount redeemable by the merchant as a credit toward a purchase amount; and
  a checkbook comprising the plurality of checks wherein each check includes an identification of an issuer that distributes the checkbook as a premium to the customers.

2. The product of claim 1, wherein the identification includes an encoded alphanumeric identifier.

3. The product of claim 1, wherein the checkbook further comprises a cover, the cover including an identification of the issuer.

4. The product of claim 1, wherein each of the plurality of checks further comprises:
  a consumer signature field; and
  a consumer personal information field.

5. The product of claim 4, wherein the personal information field relates to one or more of: a consumer name, a consumer e-mail address, a consumer telephone number, a consumer address, a consumer sex, and a consumer age.

6. The product of claim 1, wherein each of the plurality of checks further comprises:
  a pre-printed condition for redeeming the check.

7. The product of claim 6, wherein the condition for redeeming the check relates to a required minimum purchase amount.

8. The product of claim 1, wherein each of the plurality of checks further comprises:
  a respective set of coded information.

9. The product of claim 8, wherein the set of coded information authenticates the respective check.

10. The product of claim 8, wherein the coded information identifies the issuer.

11. The product of claim 8, wherein the coded information identifies the checkbook.

12. The product of claim 8, wherein the coded information identifies the user.

13. A method for attracting customers to an issuer, comprising:
  purchasing a checkbook, the checkbook comprising a plurality of checks, each check specifying a respective merchant and including a predetermined dollar amount redeemable by a merchant as a credit toward a purchase amount;
  advertising availability of the checkbook to a prospective customer of the issuer purchasing the checkbook; and
  distributing the purchased checkbook as a premium from the issuer to the prospective customer.

14. The method of claim 13 further comprising the step of:
  branding the checkbook with an identification of the issuer.

15. The method of claim 13, wherein each of the plurality of checks includes an identification of the issuer.

16. The method of claim 13, wherein each of the plurality of checks further comprises:
  a consumer signature field; and
  a consumer personal information field.

17. The method of claim 16, wherein the personal information field relates to one or more of: a consumer name, a consumer e-mail address, a consumer telephone number, a consumer address, a consumer sex, and a consumer age.

18. The method of claim 13, wherein each of the plurality of checks comprises:
  a pre-printed condition for redeeming the check.

19. The method of claim 13, wherein each of the plurality of checks further comprises:
  a respective set of coded information.

20. A method for a merchant receive a check as a credit towards an amount of a purchase, the method comprising:
  receiving the check from a consumer partaking in the purchase, the check specifying the merchant and including a pre-printed redemption amount;
  requiring the consumer to fill-in additional information on the check;
  redeeming the check with the pre-printed redemption amount applied as a credit towards the purchase amount; and
  collecting any difference between the purchase amount and the credit of the redemption amount.

21. The method of claim 20, further comprising:
  requiring the consumer to sign the check.

22. The method of claim 20, further comprising the:
  requiring the consumer to provide an e-mail address on the check.

23. The method of claim 20, further comprising:

tracking coded information on the check; and in response, identifying market-related trends.

24. A method of creating a premium to attract customers, the method comprising:

agreeing with a plurality of merchants to print a respective check, for each merchant, in a plurality of checkbooks, each respective check in a particular checkbook specifying a respective merchant and including a predetermined redemption amount that reduces a purchase price as a credit;

agreeing with a plurality of issuers to provide for each issuer a respective subset of the plurality of the checkbooks, wherein each check in the respective subset of checkbooks includes an identification of a respective issuer of the checkbook; and distributing the plurality of checkbooks.

25. The method of claim 24, wherein of distributing the plurality of checkbooks further includes distributing the plurality of checkbooks to the plurality of issuers.

26. The method of claim 24, wherein distributing the plurality of checkbooks further includes, for a particular issuer, mailing the respective subset of checkbooks to customers of that particular issuer as the premium.

27. The method of claim 24, wherein each checkbook in the respective subset of checkbooks includes an identification of a respective issuer of the checkbook.

28. The method of claim 24, wherein each of the plurality of checks further comprises:

a consumer signature field; and a consumer personal information field.

29. The method of claim 24 wherein the personal information field relates to one or more of: a consumer name, a consumer e-mail address, a consumer telephone number, a consumer address, a consumer sex, and a consumer age.

30. The method of claim 24, wherein each of the plurality of checks further comprises:

a pre-printed condition for redeeming the check.

31. The method of claim 30, wherein the condition for redeeming the check relates to a required minimum purchase amount.

32. The method of claim 24, wherein each check further comprises:

a respective set of coded information.

33. The method of claim 32, wherein the set of coded information authenticates the respective check.

34. The method of claim 32, wherein the coded information identifies one of the plurality of issuers.

35. The method of claim 32, wherein the coded information identifies one of the plurality of checkbooks.

36. The method of claim 30, further comprising:

collecting and tracking the respective sets of coded information; and in response, identifying market-related trends.

* * * * *